Patented June 12, 1934

1,962,340

UNITED STATES PATENT OFFICE 1,962,340

ADHESIVE TAPE

Eugene M. Dow, Rochester, N. Y., assignor to Eastman Kodak Company, Rochester, N. Y., a corporation of New York No Drawing. Application August 29, 1930, Serial No. 478,793

3 Claims. (Cl. 91—68)

This invention relates to adhesive tape and more particularly to tape having a cloth, paper or other fabric base upon one side of which is coated an adhesive and upon the other side of which is coated an acyl ester of cellulose having less than six carbon atoms in the acyl group, such for instance as cellulose acetate.

The manufacture of adhesive or gummed tape involving broadly a paper or fabric support is well known. The adhesive, according to previous practice, has either been of the constantly adhesive type or of the dry gum type.

Recently it has been discovered that adhesive tape of the kind having a constantly adhesive surface upon one side could be employed to advantage in decorating, painting and lacquering, for instance in the striping of automobile bodies, by laying the adhesive tape over that portion of the automobile body which is to be striped in order to mask or prevent the application of the body color to the masked portion of the body. One difficulty, however, arose with such procedure in that the usual pyroxylin lacquers were found to penetrate the masking tape and soften or alter the characteristics of the adhesive to such an extent that adhesion of the tape becomes poor or that the adhesive would not pull away from the body when the masking tape was removed, or that the lacquer or color penetrates beneath the masking tape.

I discovered that by coating the back or non-adhesive side of the masking tape with a solution of an acyl ester of cellulose having less than six carbon atoms in the acyl group, such for instance as a cellulose acetate solution, a two-fold useful purpose would be accomplished,—namely, the pyroxylin body lacquer would not penetrate the tape and thereby alter the original properties of the adhesive, and the tape could more easily be handled in rolls for the reason that the adhesive upon every convolution of the tape did not adhere so strongly to the back side of the next convolution of tape when it was covered with a coating of a lower cellulose acylate, such as cellulose acetate.

It is, therefore, among the objects of my invention to provide an adhesive tape, the adhesive side of which is coated with any desired adhesive and the back or non-adhesive side of which is coated with a lower cellulose acylate, such as a cellulose acetate composition. Other objects of my invention will further appear upon a perusal of this specification.

The production of adhesive tape in accordance with my invention is not fraught with great difficulty, it being merely necessary that the cloth or paper support or backing be passed over a mechanical device which applies the adhesive to one side of the support and that the reverse side of the tape be impregnated, sprayed, or contacted with a roll, so as to distribute upon the reverse side of the tape a thin coating of the lower cellulose acylate, such as a cellulose acetate composition. The adhesive which it is preferable to employ is well known to those skilled in the art, it being merely necessary to state that any well known type of adhesive compound may be employed, such as that ordinarily used in the production of medical adhesive tape.

The cellulose acetate composition which I employ for coating the opposite side of the tape may vary considerably in composition, although it may be stated that a suitable composition consists of approximately 25% cellulose acetate, 5% diethyl phthalate and 70% acetone. As general limits for a suitable formula, it may be stated that I may employ from 15 to 25% of cellulose acetate, from 10 to 50% of the weight of the cellulose acetate of a suitable plasticizer, such as diethyl phthalate, triphenyl or tricresyl phosphate, monochlornaphthalene or the like and the remainder of the percentage of the formula being a solvent such as acetone, or acetone and a high boiler, such as 5 to 25% of ethyl lactate; or acetone, a high boiler and a diluent, such as alcohol, ethyl acetate, toluol, etc. Similar percentages of other lower cellulose acylates such as cellulose propionate or cellulose butyrate may likewise be employed.

It will be understood that I contemplate using only the lower cellulose acylates, and preferably cellulose acetate, as the cellulose derivative for my coating composition, inasmuch as numerous difficulties such as cost, difficulty in coating, etc. are encountered in connection with the use of cellulosic esters of fatty acids higher in molecular weight than those which contain five carbon atoms, to which difficulties it is not necessary here to further refer. Suffice it to say that I do not regard the higher fatty acid esters of cellulose as equivalents for cellulose acetate, propionate or butyrate in my invention.

It will, of course, be understood that the base or support comprised in the adhesive tape of my invention is not particularly material thereto inasmuch as it may consist of smooth paper, cloth or other fabric or I may even employ corrugated, crinkled or otherwise deformed paper or cloth. In fact, it is another advantage of my invention that in view of the fact that I coat the tape upon the non-adhesive side with cellulose acetate solution, which increases the strength of the fabric or support, a saving may, if desired, be accomplished by employing a slightly thinner or inferior grade of support than would be necessary if it were not coated with cellulose acetate solution in accordance with my invention. Other advantages and variations will, of course, occur to those skilled in the art, and are to be included in the scope of the claims appended hereto.

What I claim as my invention and desire to be secured by Letters Patent of the United States is:

1. A masking tape comprising a support having an adhesive coated upon one side thereof and a coating of an acyl ester of cellulose having less than six carbon atoms in the acyl group deposited upon the other side thereof.

2. A masking tape comprising a support having an adhesive coated upon one side thereof and a coating of cellulose acetate deposited upon the other side thereof.

3. A masking tape comprising a support having an adhesive coated upon one side thereof and a thin adherent coating of a flexible cellulose acetate composition, deposited upon the other side thereof.

EUGENE M. DOW.